United States Patent Office 2,973,252
Patented Feb. 28, 1961

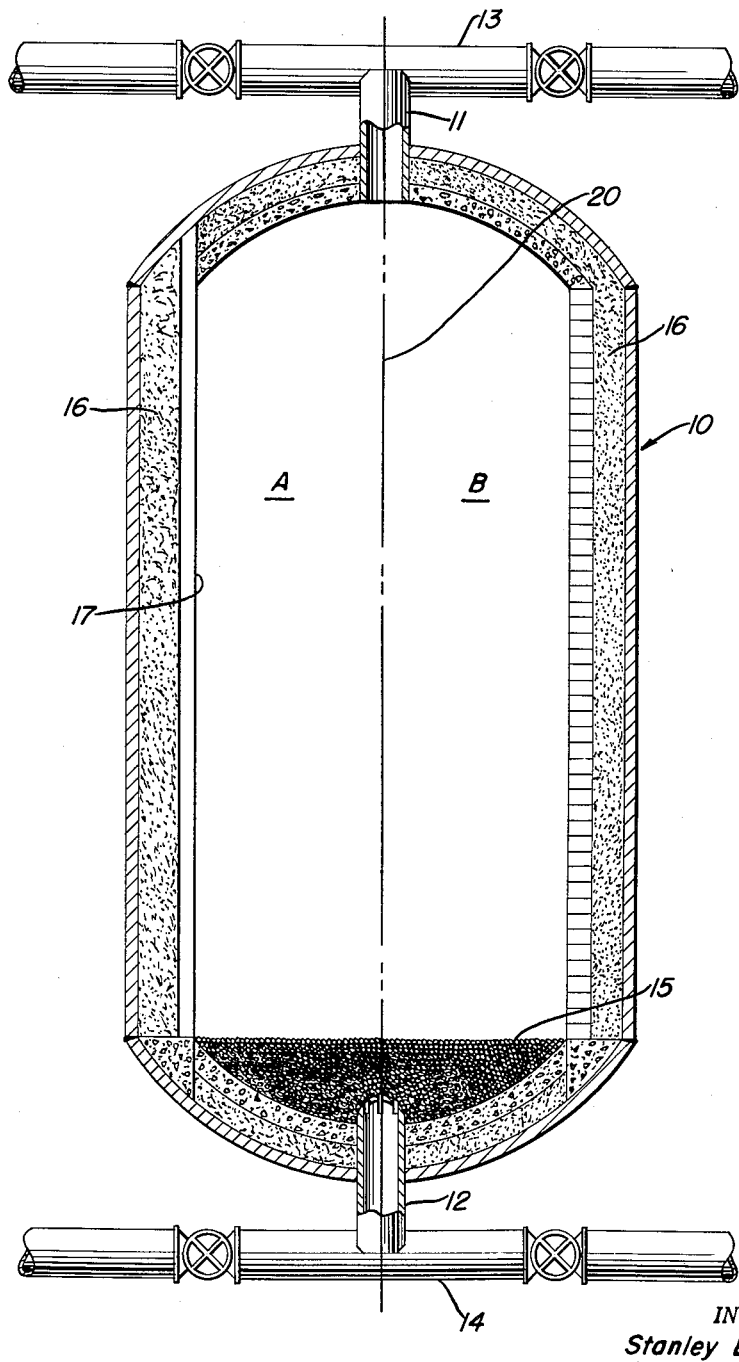

2,973,252

REACTOR APPARATUS FOR REGENERATIVE REFORMING OF HYDROCARBONS

Stanley E. Shields, Whiting, Ind., and James F. Wygant, Homewood, Ill., assignors to Standard Oil Company, Chicago, Ill., a corporation of Indiana Filed May 25, 1955, Ser. No. 510,986

1 Claim. (Cl. 23—288)

This invention relates to reactor linings for catalytic conversion processes wherein the reactants are contacted at elevated temperature with a sulfur sensitive catalyst such as in the catalytic reforming of naphthas. It provides an improved processing apparatus and, in particular, means for conducting regenerative type catalytic reforming processes with platinum type catalysts.

Most metals and refractories used in the construction of the reactor system in catalytic reforming processes pick up sulfur from contact with hydrogen sulfide during processing. Experimental work has shown that platinum-alumina catalysts used in the reforming are particularly sensitive to poisoning by sulfur retained on the exposed surfaces of the reactor system during high temperature processing. Although the mechanism is not entirely certain, it is believed that the retained sulfur is oxidized during regeneration to sulfur dioxide and sulfur trioxide. The sulfur oxides combine with the alumina base of the platinum catalyst to form activity-inhibiting sulfates. At the operating sulfur levels of most commercial units, a serious loss of catalyst life may occur from cyclic carryover of sulfur.

It has also been found that conventional refractory linings used in the reactors of commercial platinum catalyst reforming systems have given trouble in a number of instances as a result of direct physical failure caused by cracking of refractory linings, thermal spalling, abrasion, erosion or mechanical damage. Under certain conditions, cracking or disintegration of refractory linings appears to have been caused by deposition of carbon within the refractory.

Our invention is based in part on the discovery that there is a correlation between sulfur pick-up and retention by refractory materials used in reactor linings with the free iron content of the refractory materials. We have found that, in particular, materials alternately exposed to reforming and regeneration conditions must be inert to sulfur. Moreover, physical degradation of refractory linings because of carbon disintegration appears to be a function of the iron content of the refractory. Thus, it is believed that when iron is present in the refractory in contact with a hydrocarbon atmosphere, or as in regeneration in contact with an atmosphere containing carbon monoxide, an iron catalyzed reaction occurs which results in the deposition of carbon in the refractory structure.

In accordance with our invention, an improved refractory lining for metal shell reactors is provided which comprises an essentially iron-free calcium aluminate hydraulic cement combined with an essentially iron-free synthetic mineral aggregate. Advantageously, the lining may be faced with a protective layer of dense, low iron refractory concrete or a non-iron, non-corrosive metal shroud such as steel coated with aluminum. Alternatively, the facing may comprise a layer of refractory bricks, also of substantially low iron content.

The accompanying drawing illustrates, diagrammatically in divided form and partial section, a typical reforming reactor.

In the drawing, the reactor comprises a metal shell 10, usually constructed of a low alloy steel. Suitable inlet and outlet connections to the reactor are provided at 11 and 12, respectively. Usually such a reactor is used as part of a serially connected train of three or more reactors. Valved lines 13 and 14 communicating with connections 11 and 12 permit reverse flow of reactants during reforming and regeneration, usually down-flow during the former cycle and up-flow during the latter.

In the drawing, reactor 10, indicated by broken line 20, illustrates the interiors of two separate reactors A and B. Normally the cylindrical interior of either reactor would be filled with pellets or other particles of catalyst arranged in the form of a fixed bed supported by a bed of alumina balls indicated at 15 in the bottom of the reactor. In practice, it also has been found desirable to include a bed of low iron alumina balls as a filler section over the catalyst bed as an integral feature of the lining structure in addition to the alumina balls shown as catalyst support.

In both types of reactor A and B illustrated in the drawing, the lining essentially comprises a layer of insulating concrete 16 which consists, for example, of crushed insulating fire brick (as aggregate) in a calcium aluminate cement. The cement and aggregate together contain only about 0.5–1% iron. In reactor type A, an aluminum dipped steel shroud 17 is fixed within the cylindrical interior of the reactor so as to provide a protective facing for the vertically positioned layer of insulating concrete. In reactor type B, the protective facing comprises a layer of refractory fire brick of low iron content, e.g. not more than about 2%. More desirably, the protective facing may comprise a dense refractory concrete consisting, for example, of calcium aluminate hydraulic cement and an aggregate such as crushed tabular alumina containing together only about 0.2% iron.

In both types of reactor illustrated, the high density concrete, comprising by way of example ground alumina in calcium aluminate cement, may be used with advantage as a protective facing for the lower density, insulating concrete lining in the upper and lower conical domes of the reactor. It is advantageous, in any case, to use piping and metal fittings that have been aluminum dipped in order to protect the reactant fluids from direct contact with iron containing metal surfaces.

We have found that application of the refractory lining of the invention in catalytic conversion processes of the tpye using a sulfur sensitive catalyst works a substantial improvement in catalyst life, especially where a regenerative type processing cycle is employed. In this application of the invention, a hydrocarbon charge stream is passed through a metal reactor in which the exposed interior surfaces comprise a monolithic lining of refractory cement consisting essentially of a composite of substantially iron-free calcium aluminate and a substantially iron-free synthetic mineral aggregate in intimate contact with a body of solid, particle-form, sulfur sensitive catalyst. Periodically, the hydrocarbon charge is discontinued, and after appropriate purging with an inert gas, carbonaceous matter deposited on the catalyst is burned off by passing an oxygen containing gas through the reactor. The operation is continued with alternating cycles of hydrocarbon processing under catalytic conversion conditions; e.g. a temperature of 800 to 1000° F., a pressure of 100 to 750 p.s.i.g. and a hydrogen recycle rate of about 2000 to 10,000 cubic feet per barrel of feed in the case of catalytic reforming. The regenerative cycle is initiated by purging with nitrogen or flue gas, following which the carbon is burned from the catalyst with diluted air so as to control the tempertaure in the region of about 800 to 1000° F. The carbon burn-off may be followed with an air or oxygen soak, usually at super-atmospheric pressure, at about 950 to 1150° F., before repurging and recharging the hydrocarbon feed.

In practice, neither the cement nor the aggregate comprising the monolithic refractory lining should contain more than about 0.25% by weight, by preference, of iron in any form in order to reduce sulfur retention, and subsequent release, to a clearly safe operating toleranace. In some cases, where the sulfur content of the feed to the unit is relatively low or where the reforming conditions are relatively mild, larger amounts of iron may be tolerated, for example, up to about 1 to 1½% by weight. Also, the iron tolerance may be higher with the low density insulating concrete, e.g. up to about 1%, particularly when it is not directly exposed to the processing atmospheres. The cement used preferably should consist almost entirely of pure calcium aluminate hydraulic cement (approximately $3CaO \cdot 5Al_2O_3$) such as that manufactured by the Aluminum Company of America. The cement may contain small amounts of alpha aluminum oxide such as are normally found in these cements. The cement should be finely ground as in good commercial grades.

The aggregate should be a synthetic mineral, obtained by purification and heat treatment of natural or manufactured materials. The preferred aggregate for the dense refractory concrete is aluminum oxide of the type known as tabular alumina, as manufactured by the Aluminum Company of America. Other forms of aluminum oxide, as well as silicon carbide, synthetic mullite, synthetic magnesia-alumina spinel, and other stable refractory oxides or compounds may be useful, provided that their iron content is sufficiently low and that the compounds themselves do not adsorb or react with sulfur compounds. However, the physical properties of the monolithic refractory may be affected by those of the aggregate which requires attention to compressive strength, gas permeability, thermal properties, e.g. contraction on heating, and the like. The aggregate may be cleaned magnetically to remove the major portion of metallic iron contamination. It should be crushed or ground in equipment providing protection from iron contamination, or which is built of magnetic metals so that any metal contamination can be removed magnetically. In some cases, acid washing may be desirable to remove all traces of iron.

The particle size distribution of the aggregate may vary according to the method by which the refractory is to be placed; e.g. pneumatically, by troweling, by casting in forms. In any case, the particle size distribution should be such as to provide the best obtainable packing and density, and should include sufficient very fine powder to provide some plasticity or workability. Less efficient particle sizing will not affect the chemical advantages, but may adversely affect the physical properties of the refractory. By way of example, tabular alumina in the 95% passing 6 mesh and 95% passing 14 mesh grades have resulted in acceptable concretes.

The proportions of cement to aggregate in the dense refractory concrete may be varied from about 15:85 to about 40:60 by true volume. Advantageously, the proportion should be within the range of about 25:75 to 30:70 by true volume. A conventional plasticizer may be added provided that physical properties, particularly at high temperature, are not degraded and the iron content is kept low, namely not more than about 0.25% by weight of iron if the aggregate is not acid washed. It is desirable to hold the iron content to not more than 0.12% by weight if it is acid washed. Iron content can be determined satisfactorily by ASTM Des. C–18, "Chemical Analysis of Refractories," Section 33, or by X-ray fluorescene with proper calibration.

The refractory concrete may be applied, after mixing with water, by gunning, trowelling, or other suitable method. It may or may not be supported by metal or ceramic anchors, by metal studs, or by other means, but since the prevention of sulfur retention is an object, no metal should be at or close to the interior face unless it has been coated with aluminum. When carbon disintegration is a danger, all metal should be oxidation-resistant types.

When thermal insulation is a primary object of the installation, it may be provided by applying an insulating layer between the vessel and the monolithic refractory. The preferred type is a light-weight refractory concrete. For low sulfur retention, the lightweight concrete should be composed of pure calcium aluminate cement and an aggregate containing little or no iron. Examples of such aggregates are crushed insulating firebrick, expanded volcanic ashes (perlite), and aluminum oxide "bubbles," all selected for low iron content.

Although either the dense refractory or insulating type of low iron calcium aluminate concrete may be used as a monolithic reactor lining, it is advantageous to use a dense refractory facing in combination with insulating concrete. Thus, the lining may comprise a dense refractory concrete made of pure calcium aluminate cement and tabular alumina, or other essentially iron free aggregate, as described above, over a calcium aluminate-crushed fire brick concrete layer. In place of the dense concrete, the facing over the concrete liner may comprise a layer of refractory bricks of suitable thermal and physical properties which have less than about 2% by weight of iron content. Since the iron in the highly fired refractory bricks appears to be combined in a less active form relative to sulfur retention, according to our findings, somewhat higher iron content can be tolerated than in the case of the calcium aluminate concretes. Also, as illustrated in the drawing, the facing may comprise bricking for the cylindrical wall, with concrete for the curved upper and lower sections of the reactor.

The use of a metal shroud coated with aluminum also has been found to be a useful facing in combination with the insulating cement. Aluminum has been found to show very low sulfur pick-up and subsequent release. The shroud, for example, may comprise a high or low alloy steel which has been coated with aluminum by dipping or by spraying. It is also desirable to coat manifold piping, fittings, valves and metallic reactor internals which are exposed to process atmospheres; also parts such as studs, anchors and gratings which may be close to the surface with aluminum. In this way, all surfaces that may come in contact with processing atmospheres as well as the refractory and insulating liners are substantially inert to sulfur in the processing materials.

The invention will be further illustrated by reference to the following experimental results illustrating the principles of the invention.

Tests were carried out on small specimens of about 3 to 5 sq. in. surface area. These were inserted in a 1-in. reactor tube and exposed to reforming conditions. The treatment involved two operations, namely: cycle-aging to simulate effects of extended process service and sulfiding to permit pickup of characteristic amounts of sulfur, such as would occur during an extended reforming period.

In order to accentuate differences in behavior among materials, $H_2S$ concentration and temperature were somewhat higher than expected in commercial service. In the main series of tests about 0.15 vol. percent $H_2S$ was included in the simulated reforming environment. This is 50% higher than typical commercial practice. Regeneration temperature in these tests was usually 1100° F., compared with a 1050° F. maximum for commercial operation. Conditions of the tests are given in Table I.

TABLE I

*Conditions of cycle aging and sulfiding treatments*

| Operating Conditions | Cycle-Aging | | | Sulfiding Reforming |
| --- | --- | --- | --- | --- |
| | Reforming | Purge | Regeneration | |
| Period, hours | 2.9 | 0.1 | 2 | 200. |
| Total number of Periods | 50 | 100 | 51 | 1. |
| Temperature, °F | 1,000 | 1,000 | 1,100 | 1,000. |
| Pressure, p.s.i. | 300 | Atmospheric | 300 | 300. |
| Composition of atmosphere | $H_2 + 0.15$ vol. percent $H_2S$ | $N_2$ | Air | $H_2 + 0.15$ vol. percent $H_2S$ |

Table II presents data on sulfur release from several types of refractories. Corresponding iron contents also are shown. Release is expressed as mg. sulfur per unit weight (gm.) refractory and covers the initial 4-hour regeneration at 1000° F. and atmospheric pressure.

TABLE II

| Refractory Concretes | Mg. S Release/ gm. Refractory | Wt. Percent Iron in Refractory | Density, lb./cu. ft. |
| --- | --- | --- | --- |
| Calcium aluminate+tabular alumina (95%—14 mesh) | 0.12 | 0.2 | 140 |
| Calcium aluminate+calcined fire-clay aggregate | 0.75 | 1.0 | 127 |
| Impure calcium aluminate hydraulic cement containing mixed calcium, aluminum oxides, minor $SiO_2$ and $Fe_2O_3$ (Lumnite) | 8.2 | 5.8 | 160 |
| Lumnite+granulated shale aggregate | 9.0 | 8.7 | 93 |
| Portland cement+chromite aggregate | 9.6 | 5.6 | 175 |
| Insulating Concretes: | | | |
| Calcium aluminate+perlite | 1.1 | 0.61 | 55 |
| Calcium aluminate+crushed insulating firebrick | 0.6 | 0.47 | 57 |
| Lumnite cement+perlite and quartz aggregate | 11.0 | 4.2 | 56 |
| Tabular Alumina Balls: | | | |
| T-160 and T-162 (Alcoa) | 0.06 | [1] 0.03 | |
| Refractory Bricks (Super duty fire clay): | | | |
| Chicago Banner Brand (Chicago Fire Brick Co.) | 0.1 | 1.7 | 140 |
| Grefco Hi-Ac (General Refractories Co.) | 0.1 | 1.4 | 140 |

[1] From literature sources.

In general, sulfur release from refractories correlates with their iron content; however, the relationship among castables differs from that for the bricks. Much more sulfur is released from concretes than from bricks of an equivalent iron content. This is probably due to the fact that most of the iron is in the glassy phase in bricks, hence, it is less accessible than in the castables.

Bench-scale tests were run on the fire clay brick and on the calcium aluminate concretes to confirm their suitability from the standpoint of freedom from causing sulfate poisoning of the platinum catalyst. Each refractory was mixed with platinum catalyst and the mixture was used for reforming. After 45 hours of reaction with Mid-Contenent naphtha, 0.6% $H_2S$ was added for an additional 50 hours of reaction. The catalyst-refractory mixture was then regenerated, rejuvenated with a high oxygen partial pressure treatment, and retested. No sulfate poisoning had occurred. Catalyst tested by itself in a used Type 304 stainless steel reactor under similar conditions becomes seriously poisoned.

In general iron appeared to be the only component of the refractories which was significantly affected by the reforming atmospheres. It is readily accessible in the set hydraulic cements for conversion to iron sulfide during reforming, and to iron oxides during regeneration. It is accessible also in aggregates which have not been fired to a very high temperature. Since these conversions are progressive and repetitive in cycle operations, concretes with substantial iron contents appear to suffer slight but perceptible physical deterioration, possibly due to volume changes of the iron compounds and to slight carbon disintegration during reaction cycles. In general, this includes concretes containing Lumnite cement. Castables consisting of low-iron aggregates and pure calcium aluminate cement suffered no ill effects.

The reactor linings of the invention provide exceptionally high structural strength with low gas permeability. The refractory concretes in preferred form have densities of about 125–145 lb./cu. ft. and compressive strengths after heating to 1000° F. of 4000–5000 p.s.i. The gas permeability is effectively zero; for example, air permeabilities at 80° F. are typically not more than 0.003 cu. ft./hr.-sq. ft.-(in. $H_2O$ differential pressure/in. thickness). It has also been found that low density pure calcium aluminate insulating concretes of about 50 lb./cu. ft. density are decidedly superior in strength to conventional insulating concretes of similar density. In general, they are equal in strength to most conventional insulating concretes of 75 lb./cu. ft. density. Interestingly enough, increase in density of the new concretes above about 50 lb./cu. ft. density by blending with the higher density refractory concretes does not appear to appreciably increase strength at least to the extent of 1 part by weight of dense concrete (140 lb./cu. ft.) to 2.33 parts by weight of insulating concrete (52 lb./cu. ft.) to yield a product having a density of about 75 lb./cu. ft. Because of high compressive strength and low gas permeability, the low iron concrete, particularly when faced with a dense concrete, may be used with advantage in the form of a monolithic insulating wall for the reactor without firebricking or metal facing. The calcium aluminate cements also possess compositional advantages, particularly compared to Portland cements. They do not contain sulfur retarders; e.g. sulfates, and they are free of silica which tends to induce cracking, an undesired side reaction in reforming.

In use in regeneration type catalytic reforming processes, the low iron, reactor lining of the invention protects the catalyst from sulfur poisoning and thus adds appreciably to the useful life of the catalyst. In addition to increased production of specification reformate per pound of catalyst, product distribution may be improved, resulting in higher yields of specification product over the run without requiring heavy investment in desulfurization facilities for removing sulfur from the hydrocarbon charge and/or from the recycle hydrogen gas.

A further advantage in either continuous or regenerative type platinum reforming processes is provided by protecting against catalytic deposition of carbon in the refractory lining, with resulting spalling and disintegration.

We claim:

In a reactor apparatus adapted for the regenerative catalytic reforming of sulfur-containing hydrocarbons in the presence of hydrogen over a platinum-alumina type catalyst, wherein said hydrocarbons and hydrogen are passed through the catalyst under reforming conditions until said catalyst has been substantially inactivated by the formation of carbonaceous deposits thereon, and wherein said deposits are periodically removed by discontinuing reforming and passing an oxygen-containing gas through said catalyst under regeneration conditions, the improvement whereby the platinum alumina catalyst is protected from the effect of retention of sulfur and release of sulfur oxides within the reaction system, which comprises a reactor apparatus comprising: an external metal shell; an internal lining for said shell comprising a composite of calcium aluminate cement and a synthetic mineral aggregate, said composite having an iron content of not more than about one percent by weight; a fixed bed of platinum alumina catalyst particles disposed within said internal lining and means for maintaining the bed within said lining; and means for alternatively passing said hydrocarbons-hydrogen and said oxygen-containing gas through said bed.

References Cited in the file of this patent

UNITED STATES PATENTS

| | | |
|---|---|---|
| 1,454,708 | Delph | May 8, 1923 |
| 2,194,335 | Tropsch | Mar. 19, 1940 |
| 2,407,135 | Clark | Sept. 3, 1946 |
| 2,525,821 | Molique | Oct. 17, 1950 |
| 2,641,582 | Haensel | June 9, 1953 |
| 2,664,347 | Rehrig | Dec. 29, 1953 |